United States Patent [19]
Dunn

[11] Patent Number: 5,511,419
[45] Date of Patent: Apr. 30, 1996

[54] ROTATIONAL VIBRATION GYROSCOPE

[75] Inventor: William C. Dunn, Mesa, Ariz.

[73] Assignee: Motorola, Schaumburg, Ill.

[21] Appl. No.: 283,342

[22] Filed: Aug. 1, 1994

Related U.S. Application Data

[62] Division of Ser. No. 810,043, Dec. 19, 1991, Pat. No. 5,377,544.

[51] Int. Cl.⁶ ........................................... G01P 9/04
[52] U.S. Cl. ........................... 73/504.08; 73/504.12
[58] Field of Search ..................... 73/505, 510, 517 AV, 73/504.08, 504.09, 504.11, 504.12

[56] References Cited

U.S. PATENT DOCUMENTS 5,203,208  4/1993  Bernstein ................................. 73/505

FOREIGN PATENT DOCUMENTS 2113842  8/1983  United Kingdom ..................... 73/505
2198231  6/1988  United Kingdom ..................... 73/505

Primary Examiner—Hezron E. Williams
Assistant Examiner—Richard A. Moller
Attorney, Agent, or Firm—Eugene A. Parsons

[57] ABSTRACT

A rotor affixed to a central mounting post by helical springs for oscillatory rotary movement about the post. The post defining a Z axis and the sensing capacitors adjacent the rotor defining X and Y axes. The rotor, helical springs and post being formed of polysilicon in a single emiconductor process step.

3 Claims, 6 Drawing Sheets

ROTATIONAL VIBRATION GYROSCOPE

This is a division of application Ser. No. 07/810,043, filed Dec. 19, 1991, now U.S. Pat. No. 5,377,544.

The present invention pertains to vibrational gyroscopic devices and more specifically to gyroscopes incorporating rotational vibration.

BACKGROUND OF THE INVENTION

In the past, gyroscopes and gyroscopic devices were constructed of relatively large and expensive electromagnetic devices. These electromagnetic devices incorporated coils and position sensors mounted for relatively high speed, continuous rotational movement.

Eventually, micromechanical rate gyros were developed which included components formed by semiconductor processing techniques. While these devices are relatively small and utilize vibrational motion rather than continuous rotary motion, they are relatively insensitive and costly to manufacture.

Generally, the micromechanical rate gyros are constructed with a central mass, which because of the size of the gyro is very small and requires some very heavy material such as gold to provide sufficient mass. The central mass is mounted in a gimbal structure including mutually orthogonal flexible axes, with the mass and gimbal structure generally lying in a common plane. The central mass and inner mounting gimbal are oscillated or vibrated about a first of the orthogonal axes and rotational movement about an axis perpendicular to the common plane produces vibrational movement about the other of the orthogonal axes, due to the Coriolis, or gyroscopic, effect.

The described micromechanical rate gyro has several problems. Specifically, the centrally mounted mass is expensive and difficult to manufacture. It is difficult to achieve a large enough mass to provide sufficient inertia for good sensitivity and this construction reduces sensing capacitor sensitivity. Also, if the mass is offset even slightly within the gimballed mounting a noticeable sensitivity to cross-axis acceleration is produced. Second, the amount of vibrational movement is limited by the fact that the planar constructed gimbal system is mounted adjacent to a planar surface and increasing the distance between the gimbal system and the planar surface substantially increases the size of the device, which reduces sensitivity due to increased capacitor spacing as well as increasing the cost and complexity of construction. Further, by constructing the device so that the input axis is perpendicular to the common plane, the device is limited to a single axis device. Since the device only senses movement about a single axis, three of the devices must be mounted with the input axes in a mutually orthogonal relationship to sense movement in all directions.

To further reduce the size, cost and usefulness of rate gyros, there is a need for micromechanical rate gyros with increased sensitivity, due to increased inertia achieved by an increased distance of movement and/or an increase in effective mass, higher vibration frequency and smaller capacitive plate separation. Further, it would be convenient to sense movement about more than one axis with a single device.

SUMMARY OF THE INVENTION

It is a purpose of the present invention to provide vibration gyroscopes with increased sensitivity and reduced size.

It is a further purpose of the present invention to provide vibration gyroscopes capable of sensing rotation rates about more than one axes.

These purposes and others are met by a rotational vibration gyroscope including a central mounting post fixedly attached to a base and defining a first axis, a mass positioned in a plane perpendicular to the post and defining second and third axes mutually perpendicular to each other and to the first axis, generally helical spring means affixed at one end to the post and at another end to the mass, and mounting the mass for oscillatory rotary movement about the post, oscillatory motion driving apparatus mounted adjacent to the mass for causing the mass to move in an oscillatory rotary motion about the first axis, and sensing apparatus positioned adjacent to the mass for sensing movement about the third axis in response to movement of the gyroscope about the second axis due to Coriolis forces.

The rotor, helical springs and mounting post being constructed together by some convenient micromachining process, such as semiconductor processes and deposition of metals or semiconducting polysilicon.

BRIEF DESCRIPTION OF THE DRAWINGS

Referring to the drawings.

DESCRIPTION OF THE PREFERRED EMBODIMENTS

Figure 1:
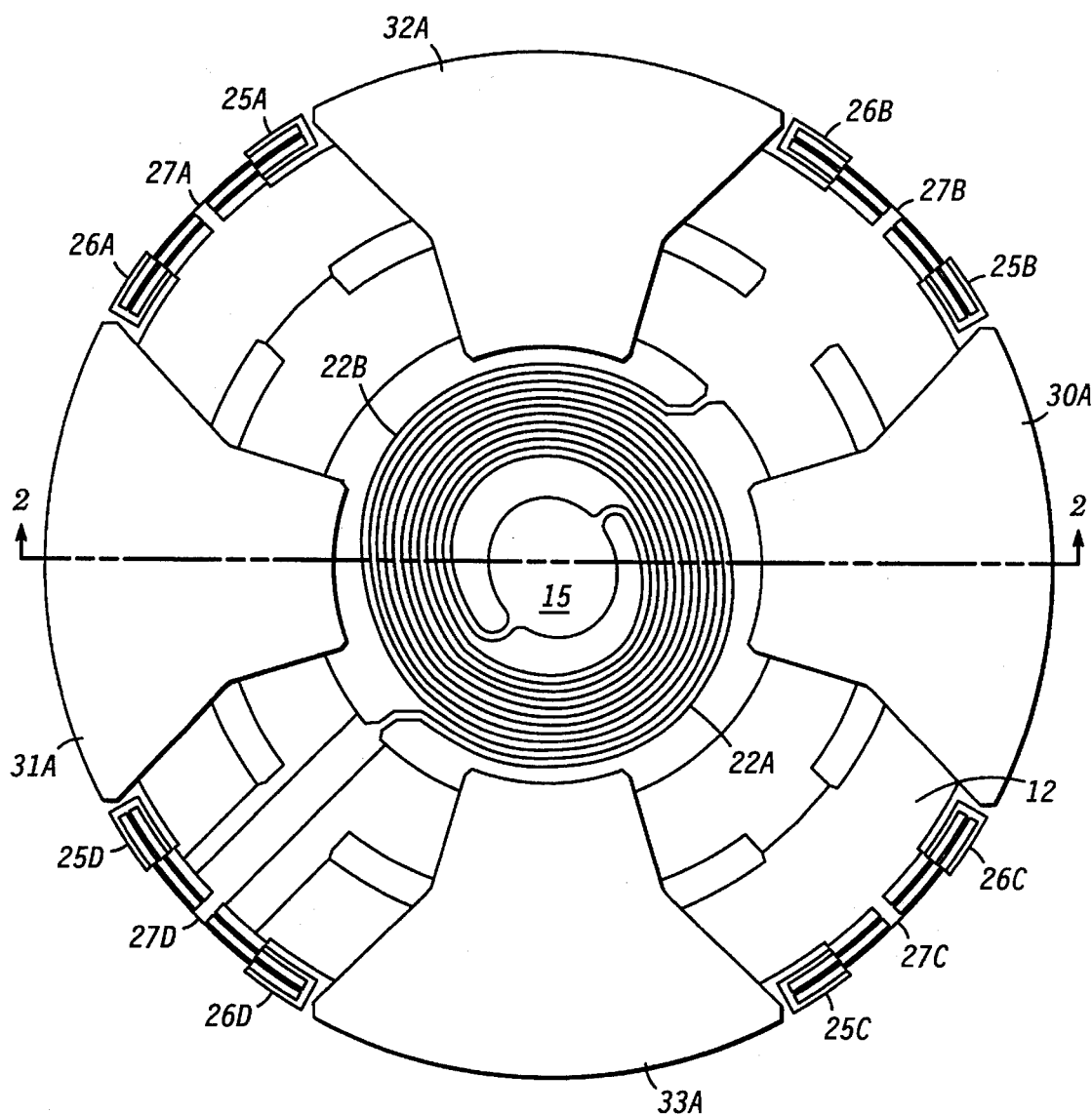
FIG.1 is a view in top plan of a rotational vibration gyroscope embodying the present invention.
Figure 2:
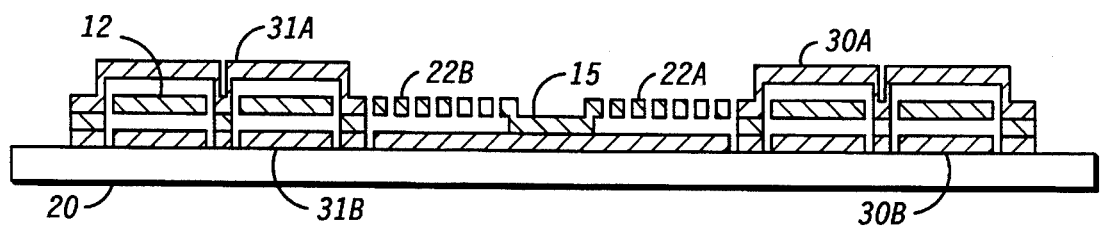
FIG.2 is a sectional view as seen from the line 2—2 in FIG. 1.

Referring specifically to FIGS. 1 and 2, a rotational vibration gyroscope 10 is illustrated embodying the present invention. Gyroscope 10 includes a generally disk shaped rotor 12 having a central opening therethrough. A centrally located mounting post 15 is affixed to a planar surface of a substrate 20 so as to be perpendicular thereto. Rotor 12 is rotatably attached to post 15 by means of a plurality, in this specific embodiment two, of helical springs 22A and 22B. Each of the helical springs 22A and 22B are fixedly attached to post 15 at one end and to the inner edge of rotor 12 at the other end. Helical springs 22A and 22B are designed to maintain rotor 12 in a plane parallel to the planar surface of substrate 20 while allowing limited rotational vibration, or oscillatory movement, about post 15.

A plurality of driving elements 25A through 25D and 26A through 26D are positioned in spaced apart relationship about the outer edge of rotor 12. Each of the driving elements 25A through 25D and 26A through 26D includes small plates (fingers) positioned adjacent to and interdigitated with similar plates 27A through 27D attached to rotor 12. All of the elements are also in the same plain as rotor 12. The plates 25A through 25D are electrically connected, as are plates 26A through 26D. By alternately pulsing plates 25A–25D and plates 26A–26D, the electrostatic attraction between plates 25A–25D and 27A–27D, and similarly between 26A–26D and 27A–27D, produces an oscillatory or rotational vibration in rotor 12. The driving elements are in diametrically opposed positions to produce uniform rotation about post 15.

For instance, if a voltage is applied between plates 25A–25D and 27A–27D, rotor 12 is rotated about post 15 until a predetermined differential capacitance is detected between plates 25A–25D and 27A–27D and between plates 26A–26D and 27A–27D. At this point the voltage is removed from plates 25A–25D and applied to plates 26A–26D. The rotational direction of rotor 12 is then reversed and rotor 12 is driven in the opposite direction until a predetermined differential capacitance is again reached. The cycle is then repeated. Using this approach, rotor 12 can be made to rotate at its natural resonant frequency with a known amplitude set by the differential capacitance trip point. The sensing of the differential capacitance and driving of rotor 12 is accomplished by periodically sampling the capacitance during the drive cycle.

A plurality of capacitive plates 30A, 31A, 32A and 33A are positioned in spaced apart overlying relationship to the upper major surface of rotor 12 to form four capacitors in conjunction with rotor 12. Four similarly shaped plates 30B through 33B are similarly positioned relative to the lower surface of rotor 12 (see FIG. 2). Capacitive plates 30B through 33B form four capacitors in conjunction with the opposite major surface of rotor 12. The capacitors formed by capacitive plates 30A through 33A and 30B through 33B are sensing capacitors which are used to sense movement of rotor 12 out of the plane of rotation, and to restore rotor 12 to its plane of rotation and in so doing measure the force acting on the rotor.

In the embodiment illustrated in FIGS. 1A and 1B, rotor 12 is rotated about the Z axis by elements 25A–25D. Capacitive plates 30A–30B and 31A–31B are symmetrically positioned relative to the X axis and capacitive plates 32A–32B and 33A–33B are symmetrically positioned relative to the Y axis. Any rotary motion of gyroscope 10 about the X axis causes movement of rotor 12 about the Y axis, due to the Coriolis, or gyroscopic, effect, which movement is sensed by changes in capacitance between capacitive plates 30A, 30B, 31A, 31B and rotor 12. Similarly, any rotary motion of gyroscope 10 about the Y axis causes movement of rotor 12 about the X axis, which movement is sensed by changes in capacitance between capacitive plates 32A, 32B, 33A, 33B, and rotor 12. The force F on rotor 12 tending to move rotor 12 out of the plane of rotation is stated as follows:

$$F = 2m\,w\,Y_A \Omega x$$

where:

m = effective mass of rotor 12;

w = vibration or oscillation frequency;

$Y_A$ = rotation amplitude; and $\Omega_x$ = rate input.

Generally, rotor 12 will be round for convenience of manufacture and operation. Because rotor 12 is rotatably supported from centrally located post 15, the mass of rotor 12 is located near its periphery rather than within a gimbal system as in the prior art, a substantially smaller rotor provides the same amount of inertia for sensing rotation. It is believed that the operating frequency "w" should approximately equal the resonant frequency of the structure which, due to the low drag in the structure, will give a high Q and an efficient drive loop. It should also be understood that for increased mechanical strength additional helical springs may be incorporated. Also, it should be noted that rotor 12 is constructed with coaxially positioned, arcuate openings therethrough having spacers formed of insulating material extending through the openings and between opposite capacitive plates. The spacers not only serve to fixedly mount capacitive plates 30A–33A in spaced relation to capacitive plates 30B–33B, but also serve to prevent harmful movement of rotor 12 during shocks and other excessive motion, thus, making gyroscope 10 relatively rugged.

By incorporating the sensing capacitors in a differential mode and utilizing closed loop sensing, an output proportional to the rotational rate of the gyroscope about either the X or the Y axes is obtained. For example, capacitors formed by capacitive plates 30A, 30B, 31A, 31B and rotor 12 are connected into a circuit so that the following equation applies with zero rotation:

$$C_{30A} + C_{31B} = C_{30B} + C_{31A}$$

When rotation of gyroscope 10 occurs about the X axis, the following effect is measured:

$$C_{30A} + C_{31B} \neq C_{30B} + C_{31A}$$

A closed loop circuit, including the sensing capacitors, is formed by using the sensed changes in capacitance to periodically apply an electrostatic force to center rotor 12 between capacitive plates 30A–33A and 30B–33B. That is, the closed loop maintains rotor 12 as close to the at-rest position as possible and still generate sense signals. By forming a closed loop circuit including the sensing capacitors, a linear output can also be obtained and the operating range is substantially increased. Sensitivity is increased by increasing the amount of rotary movement (distance moved) of rotor 12 from the at-rest position and/or increasing the rotor mass and its distance from the fulcrum. Since rotary movement of rotor 12 is not limited to the spacing between substrate 20 and the at-rest position of rotor 12 (the distance between sensing capacitor plates in the present embodiment), as in prior art structures, sensitivity of gyroscope 10 is substantially increased over prior art structures. The distance between sensing capacitor plates is made smaller to further improve the sensitivity. Also, because of the novel mounting of rotor 12 the effective mass is substantially increased, while reducing the actual mass, thereby substantially increasing the sensitivity, which sensitivity is generally less than ten degrees per hour. Also, slight offsets in the mass are compensated by the novel planar structure and differential capacitances so that cross-axis acceleration has little or no effect. Further, gyroscope 10 senses rotation about either or both of the X and Y axes and is constructed substantially smaller than prior art devices because of the extremely small dimension in the Z axes.

Figure 3:
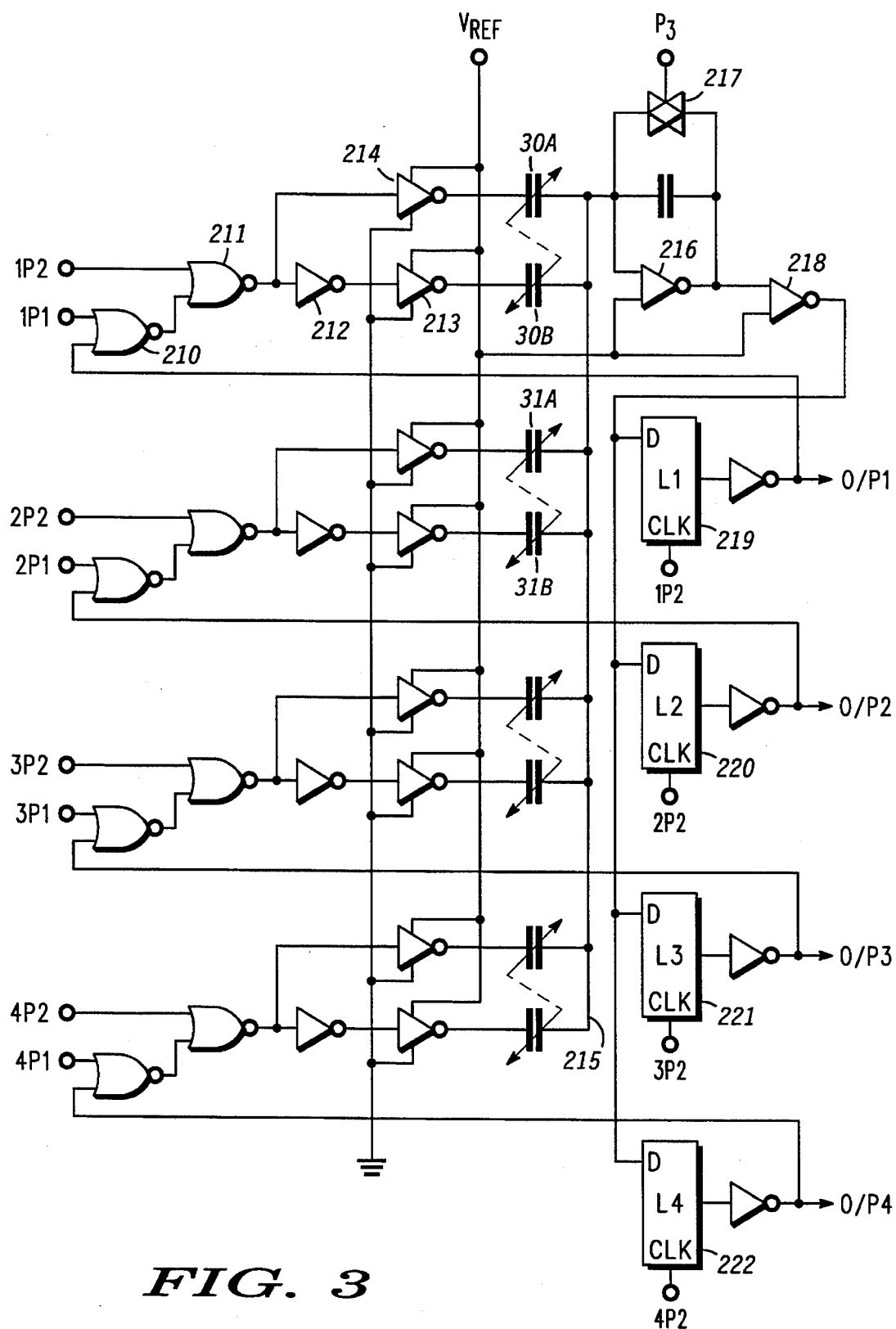
FIG. 3 is a schematic diagram of a sensing and control circuit electrically attached to the gyroscope of FIG. 1.
Figure 4:
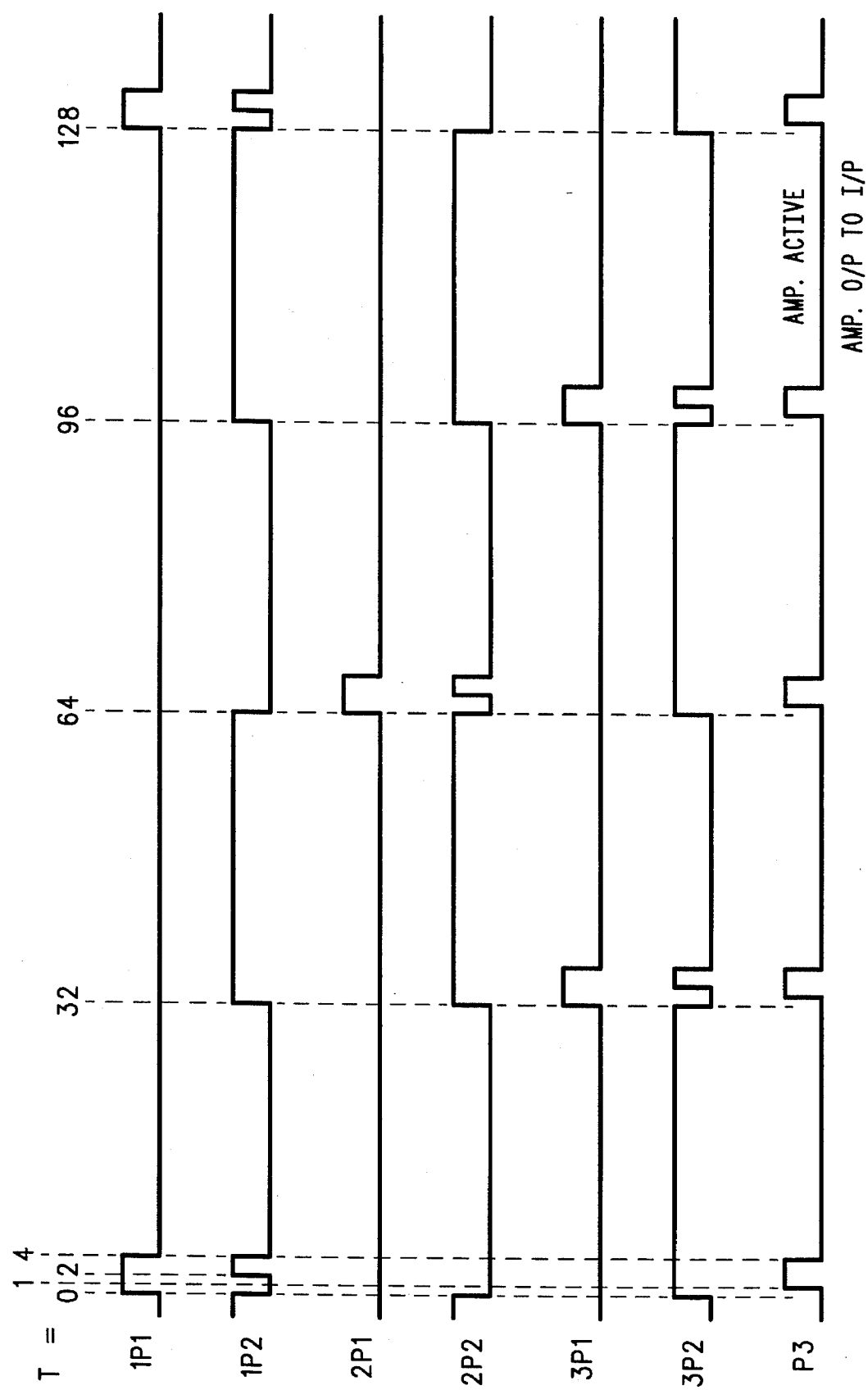
FIG. 4 illustrates waveforms available at various points of the sensing and control circuit of FIG. 3.

FIG. 3 illustrates a schematic diagram of a sensing and control circuit electrically attached to gyroscope 10 of FIG. 1. FIG. 4 illustrates waveforms available at various points in the sensing and control circuit. Central post 15 and rotor 12 of gyroscope 10 is designated node 215 in FIG. 3 and sensing and control signals are applied to the capacitive plates 30A–33B via the logic components illustrated. At time T=0 (see FIG. 4), IP1 goes high, forcing ground potential on capacitive plate 30A and $V_{REF}$ on capacitive plate 30B. The center plate 215 is held at $VRE_F$ by a virtual ground amplifier 216. Amplifier 216 has unity gain due to a switch 217 being closed by a low signal P3.

At time T=1, P3 is driven high and switch 217 is turned OFF so that amplifier 216 becomes active as a virtual ground integrating amplifier. At time T=2, IP2 switches from low to high which forces the voltage on capacitive plate 30A to switch from ground to $V_{REF}$ and capacitive plate 30B to switch from $V_{REF}$ to ground. Any difference in capacitance between the capacitances formed by capacitive plates 30A and 30B will result in a charge on node 215, which is amplified, inverted and converted into a voltage by amplifier 216. The signal from amplifier 216 is further amplified by amplifier 218.

At time T=4, after the amplifiers have had time to settle, the signal is latched by a first latch circuit 219. Latch circuit 219 is a negative edge, triggered latch circuit clocked by the signal IP2. In latch circuit 219, a positive voltage is latched as a high and a negative voltage is latched as a low. The output signal from latch circuit 219 is fed back via gates 210 and 211 to inverters 212, 213 and 214, which apply $V_{REF}$ and ground to capacitive plates 30A and 30B. $V_{REF}$ and ground potentials are applied to capacitive plates 30A and 30B to generate an electrostatic force in the quadrant, which is applied to rotor 12 to force it and maintain it in its central position during time T=4 to T=32. At time T=32 the capacitive plates in this section are again sampled.

At times T=8, 40, etc, capacitive plates 31A and 31B are sampled and the corrective forces applied to this quadrant. At times T=16 and T=24 capacitive plates 32 and 33, respectively, are sampled. Thus, each set of capacitive plates is sampled and corrective action taken in each section to centralize the position of rotor 12.

Using an MPU or other special custom logic, not shown, latch circuits 219–222 are sampled and the average high and low driving periods are compared over extended time periods. For example, by comparing:

$$\frac{\text{time driving}}{31A + 30B} \text{ vs } \frac{\text{time driving}}{31B + 30A}$$

the rotational acceleration about the X input axis is measured. Any linear acceleration in the Z direction will have a similar effect on 31A and 30A and on 31B and 30B so that these changes in the above inequality will cancel.

Similarly, by comparing:

$$\frac{\text{time driving}}{32A + 33B} \text{ vs } \frac{\text{time driving}}{32B + 33A}$$

the rotational acceleration about the Y input axis is measured. It should be noted that the output signal is an AC signal whose frequency is that of the resonant structural frequency and will have to be demodulated for comparison.

Also, by comparing:

$$\frac{\text{time driving}}{30A + 31A + 32A + 33A} \text{ vs } \frac{\text{time driving}}{30B + 31B + 32B + 33B}$$

linear acceleration along the Z input axis is measured and any rotational acceleration will cancel. It should be noted that measuring the time domain (against an MPU crystal for example) very accurate measurements can be made and, over extended periods of time using digital methods, very wide dynamic ranges can be measured, giving accurate measuring and a very sensitive device.

Referring specifically to FIG. 5 through FIG. 10, steps for manufacturing a rotational vibration gyroscope 110 similar to gyroscope 10 from FIGS. 1 and 2 are illustrated. In gyroscope 110, components similar to those in gyroscope 10 are designated with a similar number and all numbers have a "1" prefix to indicate the different embodiment.

Figure 5:
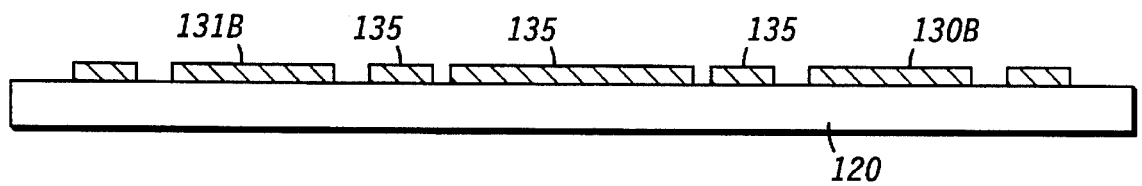
FIG. 5–FIG. 10 are sectional views illustrating various steps in a process for constructing a rotational vibration gyroscope.
Figure 6:
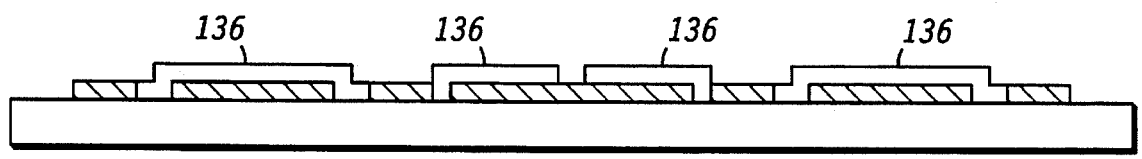

FIG. 5 illustrates a substrate 120 having a planar surface with an insulating layer on the surface, such as silicon nitride, and with capacitive plates 130B and 131B selectively deposited thereon. Capacitive plates 130B and 131B are formed of any convenient conducting/semiconducting material, such as metal, highly doped polysilicon, or the like. Spacers 135 are also selectively deposited in the same convenient material as the capacitive plates. The entire structure is then covered with an easily etched layer 136, of material generally referred to as a sacrificial material, as seen in FIG. 6. Layer 136 is formed of material that can easily be removed with no substantial effect on the remaining components, an example of which is phosphosilicate glass (PSG). Layer 136 is then selectively etched to expose spacers 135.

Figure 7:
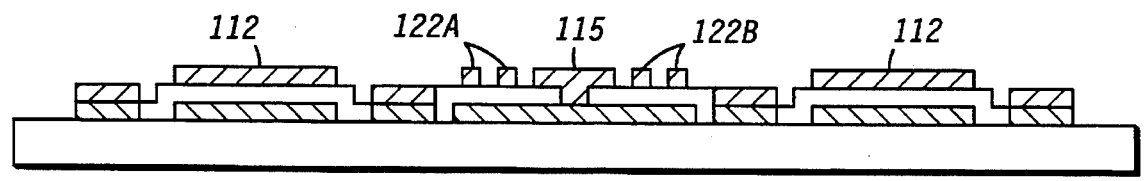
Figure 8:
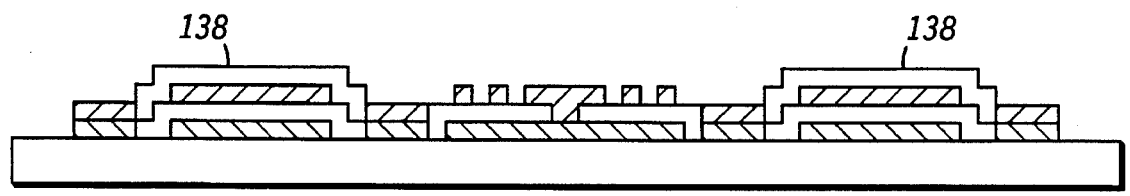

Referring to FIG. 7, a layer of material, such as polysilicon is selectively deposited to form central post 115, helical springs 122A and 122B and rotor 112. It should be noted that layer 135 is extended beyond post 115 so that it acts as an electrostatic screen between springs 122A and 122B and substrate 120. Rotor 112 is highly doped so that it is sufficiently conductive to form capacitors with the upper and lower capacitive plates. Another layer 138 of sacrificial material is selectively deposited over the polysilicon covering rotor 112, as illustrated in FIG. 8. Layer 138 is formed of the same material as layer 136 so that they can both be removed simultaneously.

Figure 9:
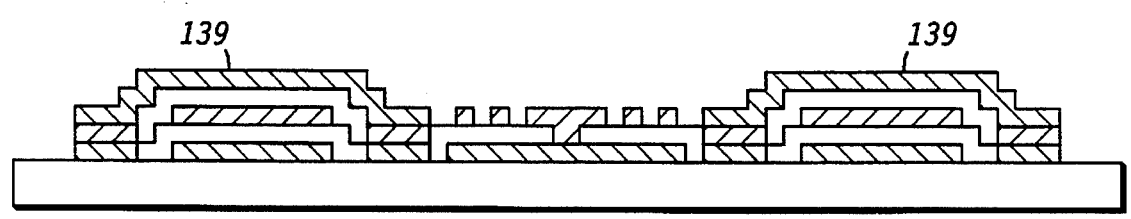
Figure 10:
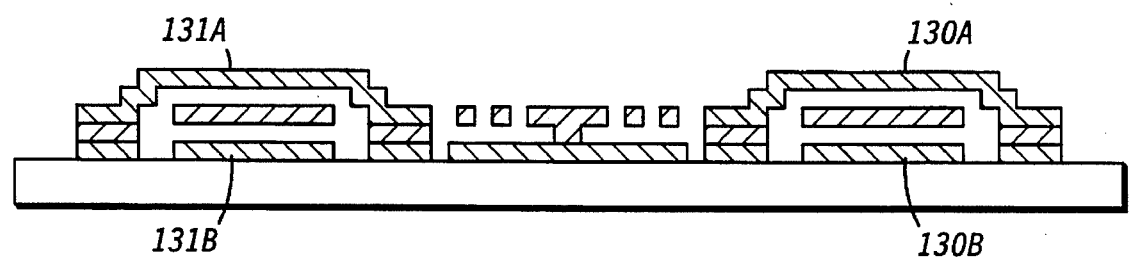

Referring to FIG. 9, layer 139, which is the same material as layers 135, 112, 115, etc., is selectively deposited on the structure. Layer 139 is utilized to form upper capacitive plates 130A and 131A, as illustrated in FIG. 10. Sacrificial layers 136 and 138 are then removed by some convenient method, such as plasma or wet etch, and the gyroscope 110 is completed. It will of course be understood by those skilled in the art that many other methods of forming gyroscope 110 may be utilized and the present described method is only one example. Also, many other surface micromachining types of materials may be utilized and the described materials are for example only. It is also possible to bulk micromachine such a structure in silicon, with wafer bonding techniques used for the assembly of the upper, lower and rotational plates.

Figure 11:
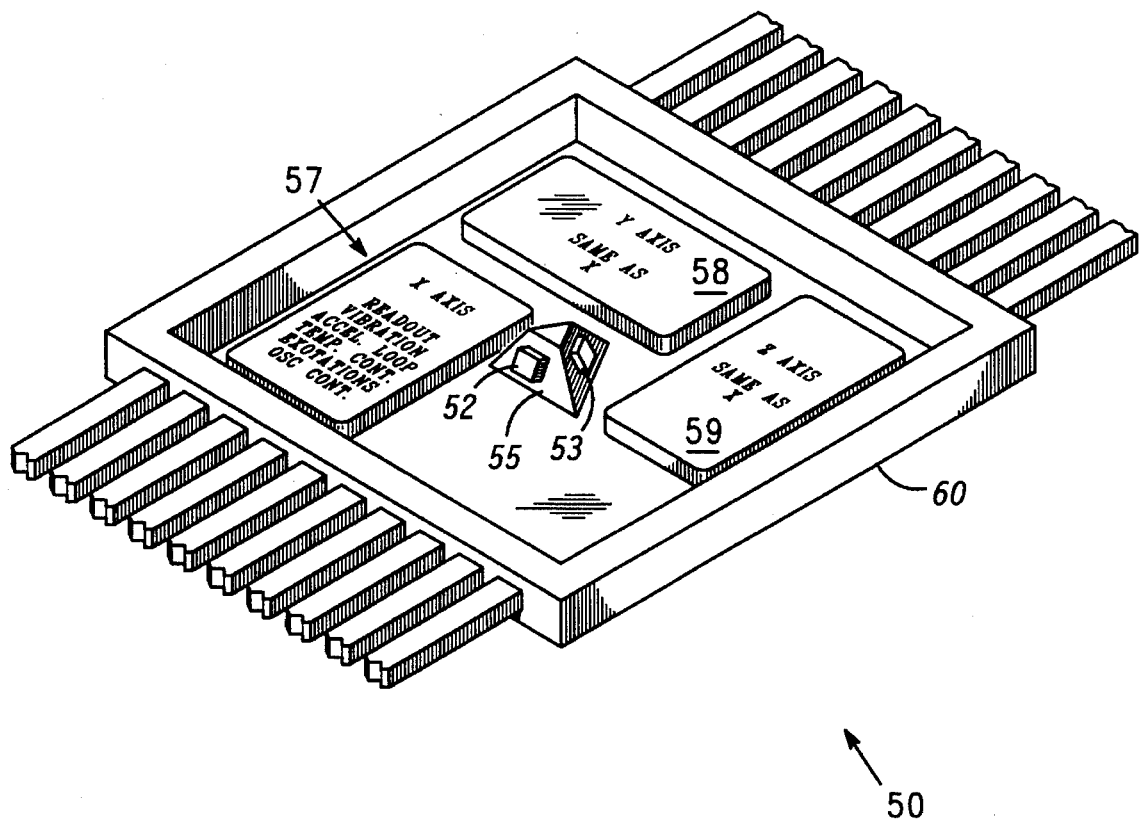
FIG. 11 is a view in perspective of an inertial system containing rotational vibration gyroscopes in accordance with the present invention.

Referring specifically to FIG. 11, an inertial system 50 utilizing gyroscopes constructed in accordance with the present invention is illustrated. System 50 includes 3 gyroscopes 52, 53 and 54 (not visible) mounted on a centrally located, truncated pyramid 55. It will of course be understood that each gyroscope 52, 53 and 54 is capable of sensing movement in two axes so that three gyroscopes are not necessary. However, for convenience in positioning and sensing three separate gyroscopes are utilized to sense movement about the X, Y and Z axes. The remaining sensory capabilities of gyroscopes 52, 53 and 54 may be used for redundancy, if desired.

Associated with each axis, X, Y and Z, is a semiconductor chip, 57, 58 and 59, containing the necessary electronic circuits to calculate rotational and linear acceleration, linear motion, or whatever other movement is desired. Pyramid 55 and chips 57, 58 and 59 are mounted within a convenient semiconductor package 60 and sealed therein.

Thus, an extremely cost effective gyroscope is disclosed which has a relatively increased sensitivity, is rugged and small in size. Further, the improved gyroscope is capable of measuring rotation rate, linear movement and/or linear acceleration. Because the gyroscope is the vibration type it can be constructed using well known semiconductor processing techniques and is therefore easy and relatively inexpensive to mass produce.

While I have shown and described specific embodiments of the present invention, further modifications and improvements will occur to those skilled in the art. I desire it to be understood, therefore, that this invention is not limited to the particular forms shown and I intend in the append claims to cover all modifications that do not depart from the spirit and scope of this invention.

What is claimed is:

1. A method of operating a rotational vibration gyroscope including a mounting post fixedly attached to a base and defining a first axis, a rotor positioned in a plane perpendicular to the post, springs affixed at one end to the post and at another end to the rotor, and mounting the rotor for oscillatory rotary movement about the post, oscillatory motion driving apparatus mounted adjacent to the rotor, and sensing apparatus, positioned adjacent to the rotor and defining second and third axes mutually perpendicular to each other and to the first axis, comprising the steps of:

supplying signals to the driving apparatus to produce oscillatory motion in the rotor about the first axis;

utilizing the sensing apparatus to sense movement of the rotor about the third axis, produced by Coriolis forces reacting to movement of the gyroscope about the second axis and to sense movement of the rotor about the second axis, produced by Coriolis forces reacting to movement of the rotor about the third axis; and supplying signals to the sensing apparatus to maintain the rotor approximately centered while simultaneously measuring the Coriolis forces on the rotor.

2. A method of operating a rotational vibration gyroscope as set forth in claim 1 wherein the step of supplying signals to the driving apparatus is further characterized by sensing the oscillatory movement and driving the rotor to a predetermined distance in each of two oscillatory directions.

3. A method of operating a rotational vibration gyroscope as set forth in claim 2 wherein the predetermined distance is chosen to produce an oscillatory movement approximately equal to a natural resonant frequency of the rotational vibration gyroscope.

* * * * *